(12) United States Patent  (10) Patent No.: US 7,212,706 B2
White et al.  (45) Date of Patent: May 1, 2007

(54) ACTIVE ALIGNMENT SYSTEM FOR FREE SPACE OPTICS

(75) Inventors: Kenneth D. White, Cocoa, FL (US); Warren H. Miller, Palm Bay, FL (US); Mark T. Montgomery, Melbourne Beach, FL (US); Reeder N. Ward, Melbourne, FL (US)

(73) Assignee: Noah Industries, Inc., Melbourne, FL (US)

( * ) Notice: Subject to any disclaimer, the term of this patent is extended or adjusted under 35 U.S.C. 154(b) by 291 days.

(21) Appl. No.: 10/824,141

(22) Filed: Apr. 14, 2004

(65) Prior Publication Data

US 2005/0243004 A1    Nov. 3, 2005

(51) Int. Cl.
*G02B 6/32* (2006.01)
*G02B 6/42* (2006.01)

(52) U.S. Cl. .......................... 385/33; 385/25; 385/90; 385/93

(58) Field of Classification Search ...................... None
See application file for complete search history.

(56) References Cited

U.S. PATENT DOCUMENTS

| | | | | |
|---|---|---|---|---|
| 5,786,923 A | | 7/1998 | Doucet et al. | 359/172 |
| 6,137,103 A | * | 10/2000 | Giles et al. | 250/216 |
| 6,348,986 B1 | | 2/2002 | Doucet et al. | 359/172 |
| 6,381,382 B2 | * | 4/2002 | Goodman et al. | 385/22 |
| 6,559,993 B2 | | 5/2003 | Doucet et al. | 359/172 |
| 6,570,692 B2 | | 5/2003 | Doucet et al. | 359/172 |
| 6,738,539 B2 | * | 5/2004 | Hagood et al. | 385/16 |
| 6,975,785 B2 | * | 12/2005 | Ghandi et al. | 385/16 |

FOREIGN PATENT DOCUMENTS

JP    59202426 A   * 11/1984

* cited by examiner

*Primary Examiner*—Michelle Connelly-Cushwa
*Assistant Examiner*—Omar Rojas
(74) *Attorney, Agent, or Firm*—Allen, Dyer, Doppelt, Milbrath & Gilchrist. P.A.

(57) ABSTRACT

An optical transceiver antenna has a pair of cartridges supported by a pan/tilt mount. A lens at forward end of a cartridge interfaces light between an end of a light relay element retained by an axial deflection device and free space. The forward end of a cartridge also terminates first ends of actuator wires that are mutually rotationally displaced a distance of 90° from one another in a plane normal to a boresight axis of the antenna. The actuator wires have second wire terminations at the axial deflection device which are mutually rotationally displaced a distance of 90° from one another in a plane passing through the axial deflection device normal to the boresight axis. Heating currents are supplied to the actuator wires, causing their lengths to change, thereby flexing the axial deflection device and light relay element off boresight.

23 Claims, 6 Drawing Sheets

ACTIVE ALIGNMENT SYSTEM FOR FREE SPACE OPTICS

FIELD OF THE INVENTION

The present invention relates in general to communication systems and components therefor, and is particularly directed to a new and improved electrically driven, thermal actuator wire-based, architecture for retaining and controllably adjusting beam-steering optical transceiver components of a free space optical transmission system, so as to provide for mutual optical alignment of a pair of spaced apart optical transceiver subsystems.

BACKGROUND OF THE INVENTION

In the course of installing an optical (e.g., laser-based) communication system, the user/installer must adjust the angular orientation of each of a pair of spaced apart optical communication (transmit/receive) units in order to achieve the required line-of-sight alignment therebetween. This adjustment generally requires coordination between two installation personnel, one at each transceiver site, and may typically involve the use of a separate sighting telescope (that has been calibrated at its manufacturing facility) through which the user looks to determine the pointing direction of the optical antenna. While looking through the sighting scope, the user adjusts the orientation of the optical antenna until the remote antenna is centered in the crosshairs of the sighting scope.

Because calibration of the sighting scope may be carried out in the presence of physical disturbances, and since disturbances may also be present during installation of the optical communication unit, the laser beam transmitted by the optical antenna may not intercept the remote optical antenna, when the unit is adjusted on the basis of the sighting scope alone. The installer may have to carry out a trial and error visual search routine, with the aid of a person at the remote site, in order to realize accurate beam incidence upon the remote optical antenna. The time required to conduct this exercise adds to the cost of installation.

Moreover, even where the sighting scope is relatively accurately calibrated (either at the factory or by trained personnel at a field site), the initial calibration may impacted over the passage of time due to thermal stresses, vibration and weather. Thus an installed system may be subject to a recurring recalibration cost. In addition to the calibration problem, the user may replace or upgrade one or more subsystems of an installed optical antenna. This may require access to one or more optical antenna components which compromises the line of sight calibration, so that the system has to be recalibrated after the change-out or upgrade.

SUMMARY OF THE INVENTION

In accordance with the present invention, the problem of obtaining and then maintaining boresight accuracy in conventional optical antenna systems, including those described above, is effectively remedied by means of a new and improved architecture for automatically controlling the beam-steering optical transceiver components of a free space optical transmission system, through the use of electrically driven thermal actuators, which augment a manual, coarse alignment subsystem, so as to maintain very precise mutual optical alignment of a pair of spaced apart optical transceiver subsystems.

For this purpose, the present invention comprises a compactly integrated optical antenna assembly of a pan/tilt mount, a dual cartridge cradle, a pair of side-by-side optical cartridges, and a protective shroud. One of the cartridges serves as a transmitter, while the other cartridge serves as a receiver, to provide for full duplex optical communication capability between line-of-sight locations. The pan/tilt mount is used to rigidly attach the optical antenna to a supporting surface, such as the top of an antenna tower, roof of a building and the like, and has orthogonally mounted pan and tilt wheels that allow for incremental manual coarse adjustment of the pointing direction of the antenna in a range of 0.5 milliradians for both azimuth and elevation.

The tilt wheel is attached to a cradle mount, so that rotation of the tilt wheel will cause rotation of the cradle mount and the transmit and receive cartridges retained by the cradle about a horizontal axis. Rotation of the pan wheel causes azimuth rotation of the pan/tilt mount about the axis of a vertically extending shaft. The protective shroud, which is attached to the cartridge cradle, extends beyond sides and ends of optics cartridges providing a weather guard and sunshade.

Each cartridge has its forward end closed by a ring that securely captures a focusing lens, which serves as light collection optic component for a receiver cartridge and as a light collimating optic component for a transmitter cartridge. The lens interfaces light between a collection, transmission aperture at the end of a light relay element, such as a coherent fiber rod, and free space. The perimeter of the ring has a pair of actuator wire terminations that are mutually rotationally displaced a distance of 90° around the ring in a plane normal to a boresight axis of the cartridge. Each termination terminates one end of a respective thermally actuated stainless steel wire.

The other end of each actuator wire is secured to a respective location of a control arm of thermally and electrically insulator material, and is displaced from the location of the other wire termination by a distance of 90° around the control arm, as viewed along the boresight axis. The two terminal ends of an individual actuator wire are located in a respective plane that contains the boresight axis. The two planes are oriented 90° with respect to one another. As a consequence, changing the temperature by supplying a heating current to one of the actuator wires will flex the support arm about an axis that is normal to the plane containing the wire and the boresight axis. Similarly, changing the temperature to the other actuator wire will likewise flex the support arm about an axis that is normal to the plane containing the other wire and the boresight axis. In this manner, the coherent fiber may undergo two-dimensional translation off boresight.

In a first embodiment of the cartridge, the coherent fiber rod is retained by a fiber rod connector, so as to project coaxially along the cartridge's boresight axis into the interior of the cartridge. The coherent fiber rod is positioned so that its end facet is coincident with the focal plane of the lens. The focus of the light collecting end facet of the coherent fiber rod can be adjusted by screwing the fiber rod connector into or out of a cartridge end cap.

In addition to being securely retained by a threaded fiber rod connector, the fiber rod passes through a like sized bore through a stepped portion of the control arm. The thickness of the stepped portion of the control arm is such that off-axis deflection of the control arm will impart a corresponding off-axis deflection of the fiber rod. The stepped portion of the control arm rests against the distal end of the threaded fiber rod connector and is affixed to the cartridge by a generally L-shaped flexure member.

The cartridge end cap further retains a multipin electrical connector through which fiber rod deflection control current is supplied to the respective actuator wire segments. By supplying current to a respective actuator wire segment, that wire segment is heated so that its length may be controllably adjusted. A bias spring is inserted between the interior surface of the rear end cap of the cartridge and the control arm, and serves to make the control arm tilt back and forth as the wires expand and contract in response to deflection control current.

The fiber rod may comprise an image-preserving component, such as a fused coherent optical fiber rod, or a grin rod, so that an individual may look through the antenna and see where the antenna is pointing. Alternatively, in a second embodiment, a section of multimode fiber may be fed through a section of syringe needle tubing which is retained by the fiber rod connector. Within the end of the tubing the optical fiber may be terminated by a glass potting material or ferule. The wires are cooled by dissipating heat to the surrounding air or gas inside the cartridge. The nominal temperature offset of the wire was chosen to be half the total temperature range plus margin. This allows the wire to cool (contract) or heat (expand) form its nominal length to encompass the desired pointing range.

In accordance with a third 'C-flex' embodiment, the control arm of the first two embodiments is replaced by a pair of inner and outer rings and an associated set of C-flex type bearing joints for mutually orthogonal rotation within a generally cylindrical back plate installed within a rear portion of the cartridge. Also, the coherent fiber rod is replaced by an optical 'pointer' into which a focus control screw tube and a fiber cable assembly have been inserted. As in the first embodiment, first ends of a pair of actuator wires are connected to terminations around the lens. The other end of each wire segment is secured to a respective location of a generally disc-shaped base from which a light pointer tube of the light pointer projects along the boresight axis.

The disc-shaped base is retained within an inner ring by means of a pair of C-flex bearings that provide for rotation of the disc-shaped base and thereby the pointer relative to the inner ring about a generally vertical axis. The inner ring, in turn, is retained within an outer ring by means of a pair of C-flex bearings that provide for rotation of the disc-shaped base and thereby the pointer about a generally horizontal axis. The outer frame is captured with a backplate that is sized to fit within the interior cylindrical wall of the cartridge.

Light collection is effected by means of a fiber cable assembly which is inserted through a generally wide diameter bore in the backplate and into a generally longitudinal focus screw tube threaded into the light pointer tube of the light pointer. In this manner, the boresight axis position of a ferule at the distal end of the fiber cable assembly is readily adjustable. As in the first embodiment, a bias spring is inserted between the back plate and the disc-shaped base so as to make the light pointer tilt back and forth about respective axes as the actuator wires expand and contract in response to controlled current applied thereto.

In each embodiment, initial aiming and calibration of the optical antenna may be accomplished by coupling the optical output of the antenna to a signal power measurement device, and then incrementally manually adjusting the pan and tilt wheels of pan/tilt mount until the monitored output is maximized. Thereafter, using a beam splitter the receiving antenna output is continuously monitored by an associated signal processor which executes a beam optimizing algorithm to establish control currents to the control inputs of the multipin electrical connector. By applying control currents to the actuator wires, the aiming position of the collected light relay optics may be adjusted, as necessary, so that the collection fiber is continuously steered so as to cause the optical antenna to effectively track the received beam.

DETAILED DESCRIPTION

Figure 1:
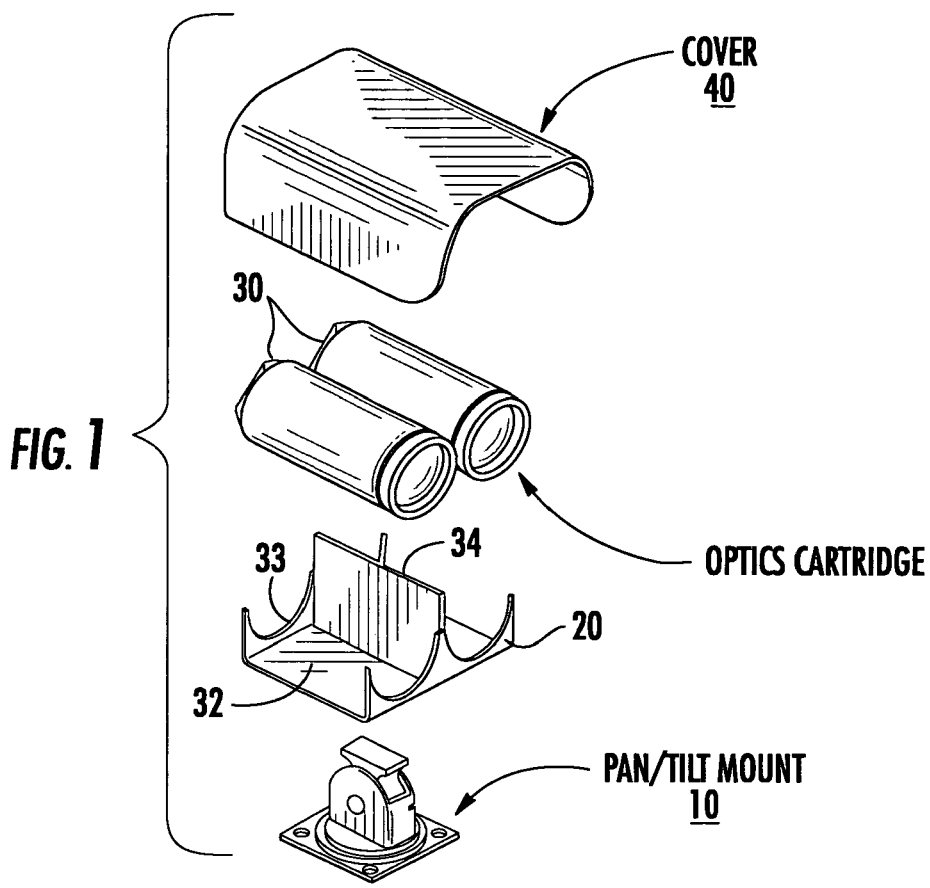
FIG. 1 is a diagrammatic exploded view of a free space optical antenna in accordance with the present invention.

As pointed out briefly above, and as will be explained in detail below, the free space optical antenna architecture of the present invention employs a thermal actuator-based tracking subsystem, which serves to automatically controllably adjust beam-steering optical transceiver components of the antenna. As diagrammatically illustrated in the exploded view of FIG. 1, a respective free space optical antenna in accordance with the present invention contains a pan/tilt mount 10 (to be described in detail below with reference to FIGS. 2 and 3), a dual cartridge cradle 20, a pair of transmit and receive optical cartridges 30 (to be described with reference to FIGS. 7–15), and a protective cover or shroud 40.

The pan/tilt mount 10 is used to rigidly attach the antenna to a supporting surface, such as the top of an antenna tower, roof of a building and the like. In addition, it is configured to provide for incremental manual coarse adjustment of the pointing direction of the antenna in both azimuth and elevation. For this purpose, as diagrammatically illustrated in the perspective exploded view of FIG. 2, the pan/tilt mount includes a generally flat mounting plate 11, having a plurality of bores 12, for receiving suitable fittings such as bolts and the like that affix the mounting plate to an underlying surface, such as support rails of a transmission tower.

The mounting plate 11 also contains an aperture 13 that is sized to receive a bolt 14, that extends vertically through the aperture 13, and whose longitudinal axis 15 defines the azimuth axis of rotation of the mount and thereby the coarse rotational azimuth axis of the antenna. The bolt 14 passes through an aperture 16 in a rotatable toothed pan wheel 17, that is placed atop the mounting plate 11, and retained in frictional engagement with the top surface of the mounting plate by a draw or tightening screw 18 that is threaded onto the bolt at the underside of the mounting plate.

Azimuth adjustment of the pan wheel is accomplished by inserting a tool such as the blade of a screwdriver and the like through a pair of closely positioned pins or posts 19 that are inserted into the top surface of the mounting plate adjacent to the perimeter of the pan wheel, so that the pan wheel 11 and the structure of the antenna that is supported by the pan wheel may be incrementally manually rotated by leveraging the screwdriver blade against the pins as the end of the blade is pushed against and rotates the teeth of the pan wheel. Practical tests have found that an operator is able to achieve angular adjustments in the range of 0.5 milliradians for both azimuth and elevation adjustments in this manner.

Figure 3:
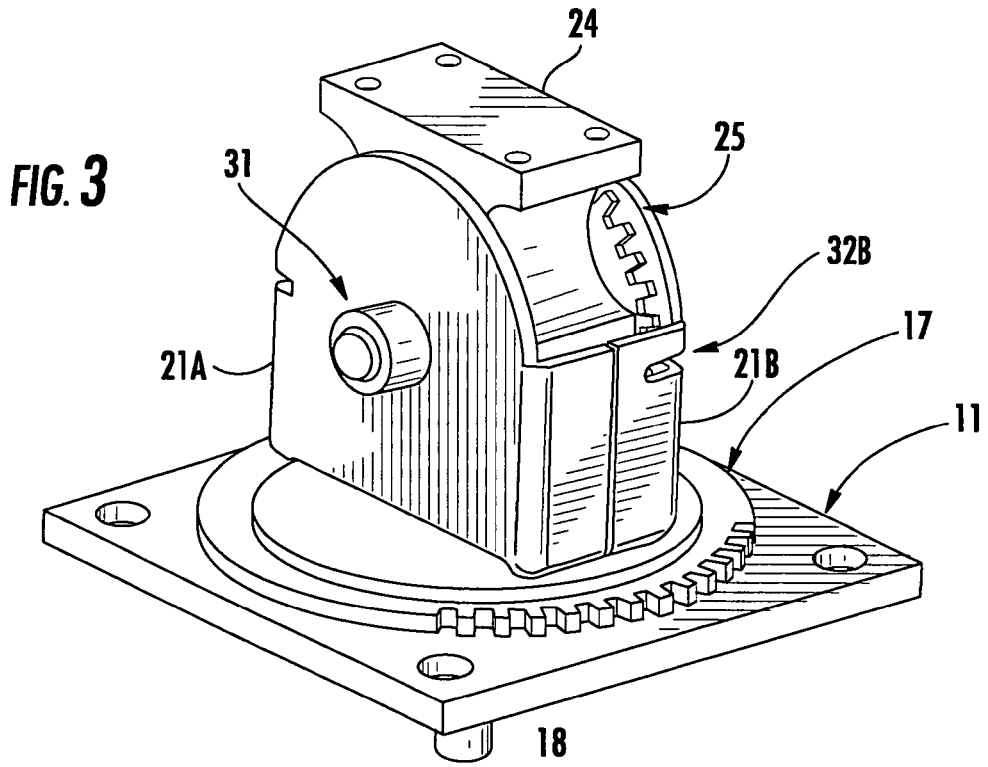
FIG. 3 shows the assembled configuration of the pan/tilt mount of FIG. 2.

The toothed pan wheel 17 supports an elevation adjustment cradle support frame 21, comprised of a pair of frame halves 21A and 21B having flat bottom tabs 22A and 22B that are placed upon the top surface of the pan wheel 17, and vertical sidewalls 23A and 23B whose widths are sized to accommodate the thickness of a cradle mount 24 and a toothed tilt wheel 25 that are captured between end walls 26A and 26B of the cradle support frame halves 21A and 21B. Each of the cradle support frame halves 21A, 21B, the cradle mount 24 and the tilt wheel 25 have mutually aligned horizontal bores that are sized to receive a bolt that serves as a horizontal axle for elevation rotation of the cradle mount 24. The bottom tabs 22A and 22B of the respective frame halves 21A and 21B contain semicircular slots, one of which is shown at 28B, that are sized to allow the shaft of the vertical bolt 14 to pass therethrough, when the two frame halves are joined together to form the elevation adjustment cradle support frame 21. The tilt wheel 25 is attached to the cradle mount 24 by way of a set of pins 29. The components of the elevation adjustment cradle support frame are held together by a draw nut fastener 31 that is threaded onto the horizontal bolt, which has been passed through frame half 21B, tilt wheel 25, cradle mount 24 and frame half 21A. The assembled configuration of the pan/tilt mount 10 is shown in FIG. 3.

To provide for elevation adjustment of the tilt wheel, one of the sidewalls 23B of the frame half 21B has a horizontal slot 32B that is sized to accommodate the insertion of a bladed tool such as a screwdriver for engagement with the teeth of the tilt wheel. In this manner, similar to the pan wheel, the tilt wheel 25 and cradle mount 24 solid therewith may be incrementally manually rotated in elevation by leveraging the screwdriver blade against the slot as the end of the blade is pushed against and rotates the teeth of the tilt wheel 25. Thus, rotation of the toothed tilt wheel 25 will cause elevation rotation of the cradle support 24 and thereby the cradle 20 and the pair of transmit and receive cartridges 30 about the axis of horizontal bolt 27. On the other hand, rotation of the toothed pan wheel 17 imparts azimuth rotation of the pan/tilt mount 10 about the axis of the vertically extending bolt 14 through which the toothed pan wheel 17 is rotationally attached to the mounting plate 11.

Figure 2:
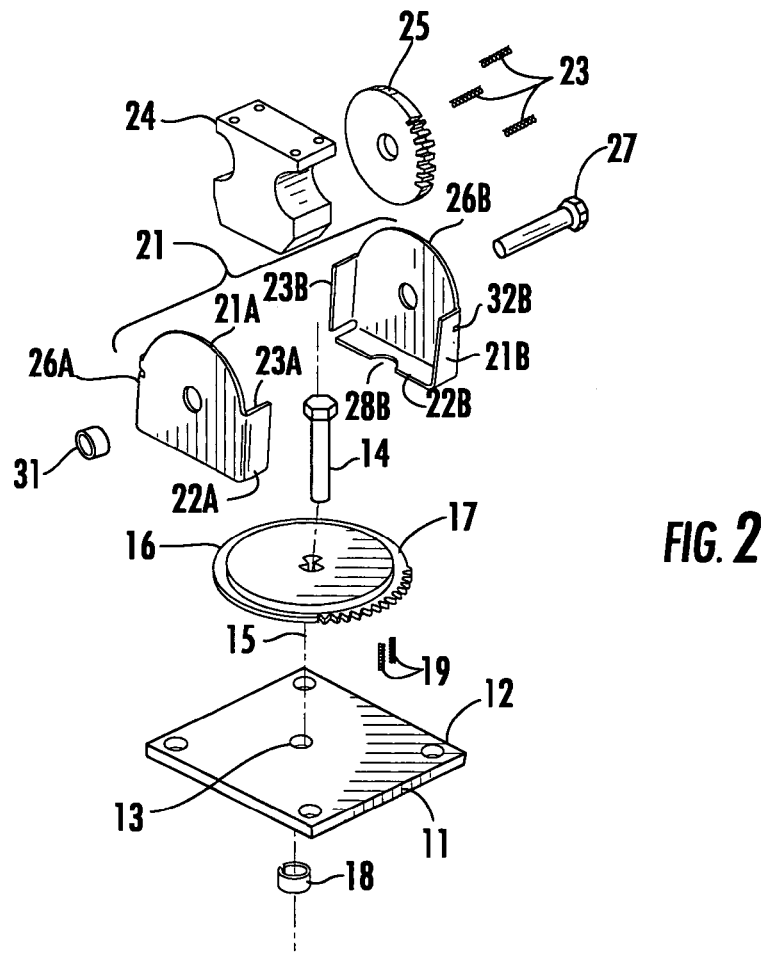
FIG. 2 is a perspective exploded view of a pan/tilt mount employed in the free space optical antenna of FIG. 1.

Referring again to the exploded view of FIG. 1, the cartridge cradle 20 has a generally flat base 32 from which extends a center wall 34. The flat base 32 is attached by suitable fittings (e.g., threaded screws) into associated threaded bores in the top surface of the cradle support 24 of the pan/tilt mount 10. End walls 33 and 34, which extend vertically from opposite ends of the base 32, are generally semicircularly configured, and are sized to receive and securely capture the two generally cylindrically shaped optics cartridges 30.

The protective shroud 40 is attached by screws and the like to the center wall 34 of the cartridge cradle 20. The shroud is shaped so that, when mounted to the top of the cradle's center wall 34 in the assembled condition of the antenna, diagrammatically shown in the front perspective view of FIG. 4 and the rear perspective view of FIG. 5, the shroud 40 will extend beyond the sides and the ends of optics cartridges 30, providing a weather guard and sunshade.

Figure 5:
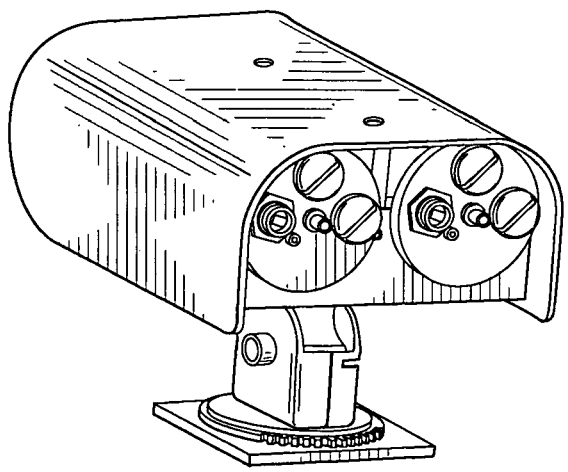
FIG. 5 is a rear perspective view of an assembled free space optical antenna of the present invention.
Figure 6:
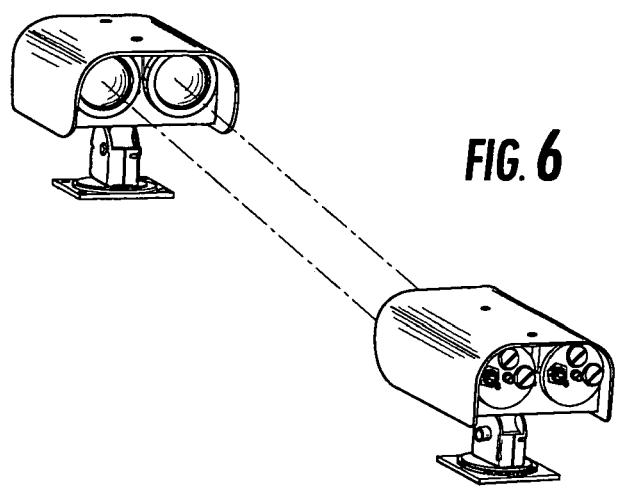
FIG. 6 is a reduced complexity illustration of a free space optical communication scheme, which employs a pair of the optical antennas of FIGS. 1–5.

FIG. 6 is a reduced complexity illustration of a free space optical communication scheme, which employs a pair of optical antennas described above with reference to FIGS. 1–5. Within each antenna, one of two side-by-side optics cartridges serves as a transmitter, while the other cartridge serves as a receiver, to provide for full duplex optical communication capability between line-of-sight locations (such as the tops of buildings or towers, on which the antennas are mounted).

Figure 4:
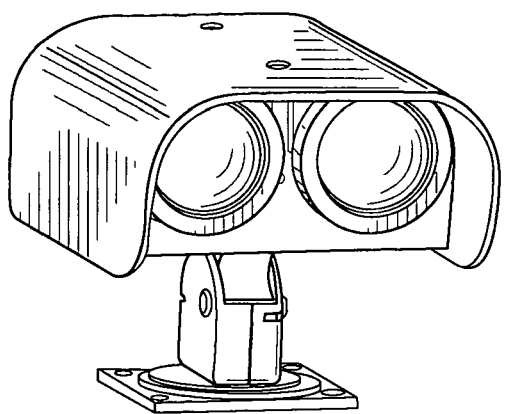
FIG. 4 is a front perspective view of an assembled free space optical antenna of the present invention.
Figure 7:
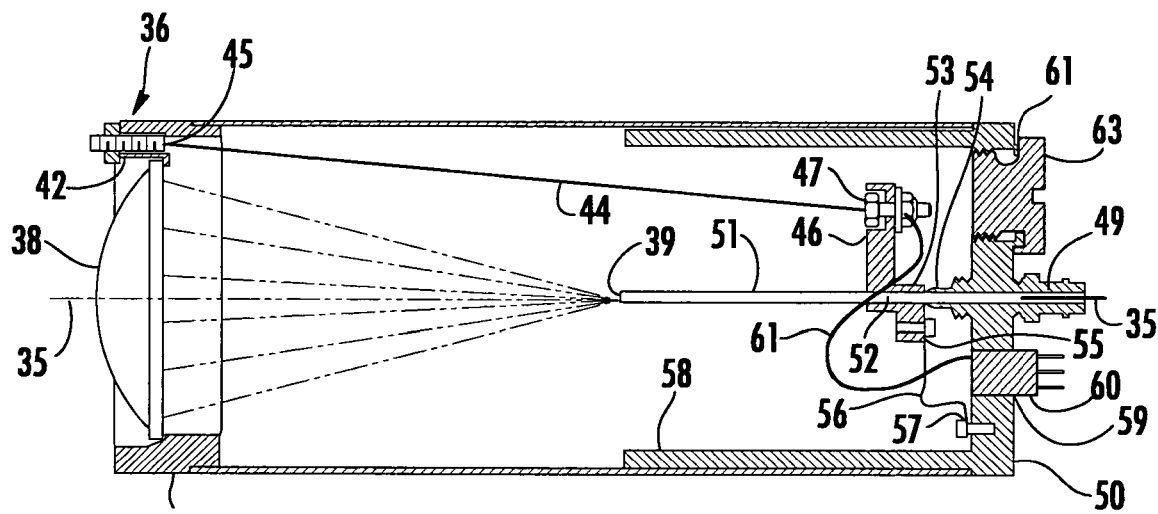
FIG. 7 is a side view of the interior configuration of a first embodiment of a cartridge unit of the free space optical antenna of FIG. 1;.
Figure 8:
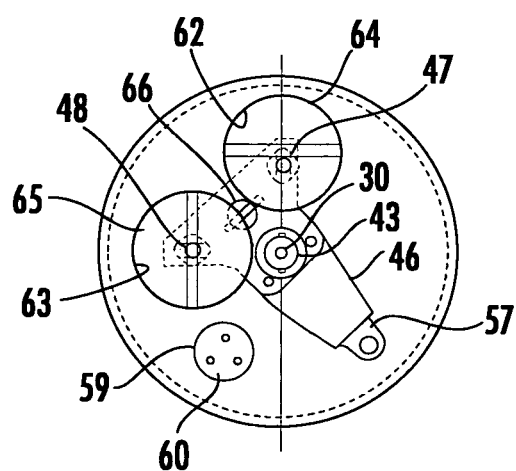
FIG. 8 is a rear end view of the cartridge unit of FIG. 7.
Figure 9:
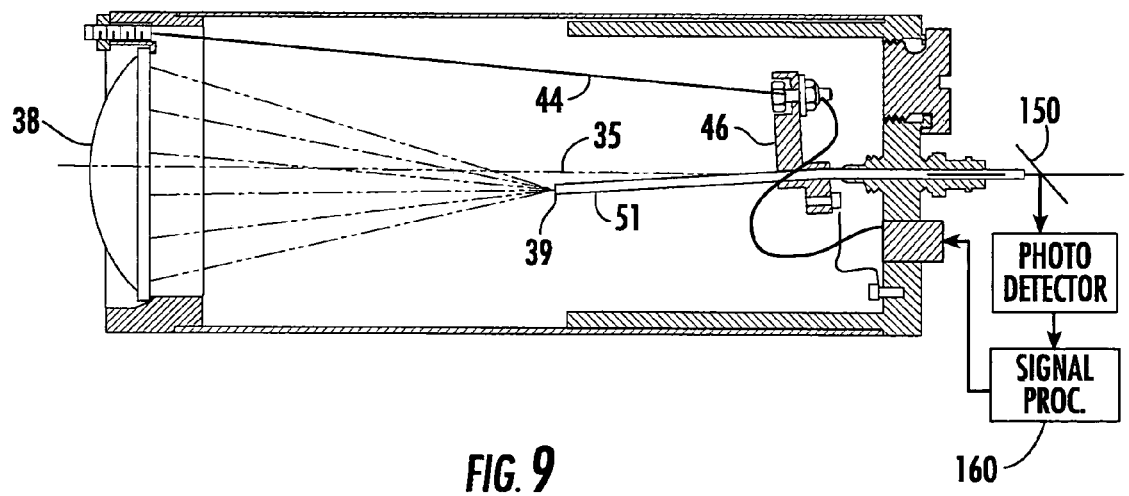
FIG. 9 is a side view of the interior configuration of the cartridge unit of FIG. 7 showing the deflection of a coherent fiber rod.

Attention is now directed to FIGS. 7 and 8, which are respective diagrammatic sideinterior and rearend views of a respective one of the transmit and receiver cartridges 30 shown in FIGS. 1, 4 and 5, described above. A respective cartridge 30 is configured as a generally cylindrically or tubular shaped metallic body or housing that is generally rotationally symmetric about a central (boresight) axis 35. A first or forward end 36 of the cartridge has a stepcontoured, cylindrical ring 37, that is sized to fit within and close the forward end of the cartridge, and to also securely capture a light directing component (e.g., a focusing lens) 38, the perimeter of which is captured by and sealed against the cylindrical ring 37. The lens 38 serves as a light collection optic component for a receiver cartridge and as a light collimating optic component for a transmitter cartridge. It should also be noted that the light directing component 38 is not limited to a focusing lens, but may include other light directing elements such as mirrors and additional lenses. The function of the light directing component is to interface light between a collection, transmission aperture 39 at the end of a light relay element 51 (e.g., coherent fiber rod) and free space.

The perimeter portion of the cylindrical ring 37 also contains a pair of bores, one of which is shown at 42 in the side view of FIG. 7. The second bore is located a distance of 90° around the ring 37 in a plane normal to the boresight axis 35, relative to the location of bore 42, as viewed along the boresight axis 35 of the cartridge. Each of these two bores serves to terminate one end of a respective actuator wire 44, by means of a suitable fitting, such as a threaded bolt and screw, and the like. As a non-limiting example, each actuator wire may comprise a same length segment of stainless steel wire.

The other end of each actuator wire segment 44 is similarly secured to a respective location of a control arm or lever 46, that is displaced from the location of the other actuator wire termination by a distance of 90° around the control arm 46, as viewed along boresight axis 35. For this purpose, as shown in the end view of FIG. 8, the control arm 46, which is preferably made of thermally and electrically insulator material, is generally V-shaped, having a pair of wire-anchoring locations 47 and 48 that are 90° apart from one another as viewed along boresight axis 35. The boresight axis 35 passes through the center of the light directing (focusing) lens 38 and the center of a threaded fiber rod connector 49 threaded into the center of the cartridge's rear end cap 50.

The two terminal ends of an individual actuator wire 44 are located in a respective plane that contains the boresight axis. These two planes are oriented 90° with respect to one another. As a consequence, changing the temperature (as by supplying a heating current) to one of the actuator wires 44 will flex the support arm about an axis that is normal to the plane containing the actuator wire and the boresight axis. Similarly, changing the temperature to the other actuator wire will likewise flex the support arm about an axis that is normal to the plane containing the other actuator wire and the boresight axis. In this manner, an optical waveguide element (such as a coherent fiber rod that projects along the boresight axis) may undergo two-dimensional translation off boresight.

In accordance with a first embodiment of the cartridge of the invention, an optical waveguide relay element in the form of a coherent fiber rod 51 is retained by (e.g., bonded to) the fiber rod connector 49, so as to project coaxially along the cartridge's boresight axis 35 into the interior of the cartridge. The coherent fiber rod 51 is sized and retained by the fiber rod connector 49, such that its end facet 39 is coincident with the focal plane of the lens 38. The focus of the light collecting end facet 39 of the coherent fiber rod 51 is adjustable by screwing the fiber rod connector 49 into or out of the end cap 50, so that the fiber rod 51 is translatable along the optical axis of the lens 38.

In addition to being securely retained by threaded connector 49, the fiber rod 51 passes through a like sized bore 52 through a stepped portion 53 of the control arm 46. The thickness of the stepped portion 53 of the control arm is such that off-axis deflection of the control arm 46 will impart a corresponding off-axis deflection of the fiber rod 51. The stepped portion 53 of the control arm 46 rests against the distal end 54 of the threaded fiber rod connector 49 and is affixed to one end 55 of a generally L-shaped flexure member 56 by screws and the like. A second end 57 of the L-shaped flexure member is affixed (by a suitable connector such as a screw and the like) to the interior surface of the end cap 50 adjacent its cylindrical-sidewall 58. In this manner the control arm 46 is effectively retained in a quasi-cantilever condition within the cartridge.

The cartridge end cap 50 also has an aperture 59 that is sized to receive a multipin (three-pin) electrical connector 60. Two of the pins of the connector 60 are coupled through associated leads, one of which is shown at 61, to the wire-anchoring locations 47 and 48 of the control arm 46. The third lead is coupled to the cartridge ground. By supplying current to a respective actuator wire segment 44, that wire segment is heated so that its length may be controllably adjusted. Varying the lengths of the actuator wire segments causes deflection of the control arm 46 about respective orthogonal X and Y axes lying in a plane that is normal to the boresight axis 35. As the control arm 46 is deflected in this manner, there is a corresponding deflection of the fiber rod 51, and thereby the end facet 39 thereof at the focal plane of the lens 38. This translation changes the line-of-sight or pointing of the optical antenna, as diagrammatically shown in FIG. 9.

In addition to retaining the fiber rod connector 49, and the multipin electrical connector 60, the cartridge rear end cap 50 has a pair of threaded apertures 62 and 63, that are sized to receive associated threaded plugs 64 and 65. Apertures 62 and 63 are located adjacent to the respective actuator wire termination locations 47 and 48 of the control arm 46, so as to provide access to these and other components within the interior of the cartridge. Finally, a bias spring 66 is inserted between the interior surface of the rear end cap of the cartridge and the control arm. This spring serves to make the control arm tilt back and forth as the actuator wires 44 expand and contract in response to controlled current applied thereto.

EXAMPLE

As a non-limiting example, a tracking optical antenna was implemented to operate in receiver mode, wherein the lens 38 serves to collect light and focus it onto the end facet 39 of the coherent fiber rod 51. The focusing lens had an effective focal length of 70 mm, with the receiver aperture corresponding an end face of a three inch long (63 mil diameter) multimode fiber rod having a 62.5 micron core. The other end of the fiber rod 51 was positioned at the focal point of the lens 38. It may be noted that the fiber rod may comprise an image-preserving component, such as a fused coherent optical fiber rod, or a grin rod, so that an individual may look through the antenna and see where the antenna is pointing.

Figure 10:
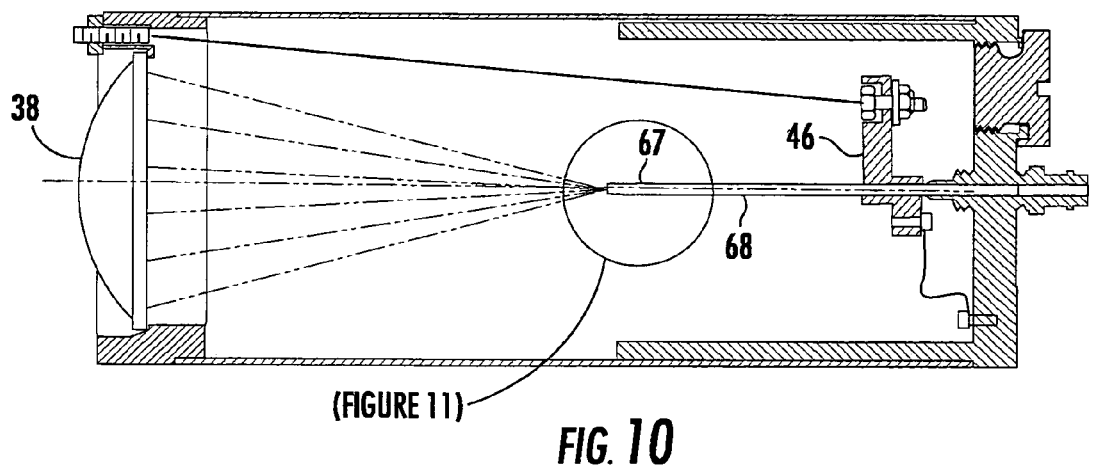
FIG. 10 is a side view of the interior configuration of a third embodiment of a cartridge unit of the free space optical antenna of FIG. 1.
Figure 11:
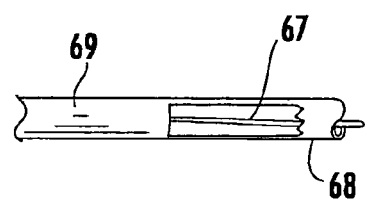
FIG. 11 is an enlarged view of a portion of FIG. 10.

Alternatively, as diagrammatically illustrated in the side view of FIG. 10 and the enlarged partial view of FIG. 11, a section of multimode fiber 67 may be fed through a section of syringe needle tubing 68, which is retained by the fiber rod connector 49. Within the end of the tubing 68, the optical fiber may be terminated by a glass potting material or ferule, as shown at 69 in FIG. 11. The actuator wire segments 44 may comprise a pair of 108 mm lengths of stainless steel wire.

In the present example, the desired pointing range variation is within +/−3 milliradians from the nominal boresight along axis 35. The amount of translation required at the focal point of lens 38 is equal to the product of the effective focal length and the angular range; namely, 70 mm×0.006 radians=0.42 mm. The combination of the lever arm and free fiber rod length provides a gain of approximately 2 from the displacement of the actuator wire 44 to the displacement of the end facet 39 of the fiber rod. The required range of movement of the end of the stainless steel actuator wire segment is therefore 0.21 mm. Stainless steel has a thermal coefficient of expansion of approximately 16 ppm per degree C. Therefore, the required change in wire temperature to realize the desired pointing range can be estimated to be 0.21 mm/108 mm/16 ppm per degree C., or 122 degrees C.

As described above, the temperature of the actuator wire segments is controlled by the application of electrical current through the actuator wires. This makes use of the natural resistivity of the actuator wires to dissipate the electricity as heat, causing the actuator wire's temperature to increase. It was determined that a 9-mil stainless steel wire will expand approximately 0.15 mm per watt of heating, yielding a temperature change of 58 degrees C. per watt. To realize an expansion of 0.21 mm therefore requires an addition of 1.4 watts of heating.

The actuator wires are cooled by dissipating heat to the surrounding air or gas inside the cartridge. The nominal temperature offset of the actuator wire was chosen to be half the total temperature range plus margin. This allows the actuator wire to cool (contract) or heat (expand) form its nominal length to encompass the desired pointing range. Using a margin of 20 degrees C, the nominal temperature offset was chosen to be 20+122/2=81 degrees C. This corresponds to approximately 1.4 watts of electrical power being dissipated by the actuator wire. To steer the antenna line of sight by +/−3 milliradians in one direction, the power is increased/decreased by one watt from the nominal. The resistance of the wire is 3.6 ohms, yielding an electrical current within a range of 0.4 to 1.0 amps for the +/−3 milliradians pointing range.

Figure 12:
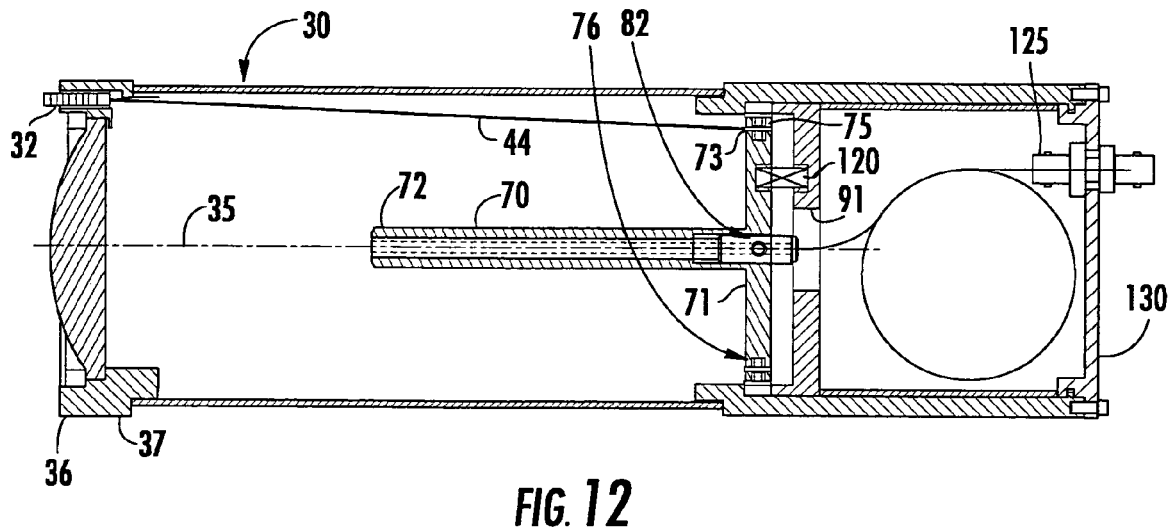
FIG. 12 is a side view of the interior configuration of a third embodiment of a cartridge unit of the free space optical antenna of FIG. 1.
Figure 13:
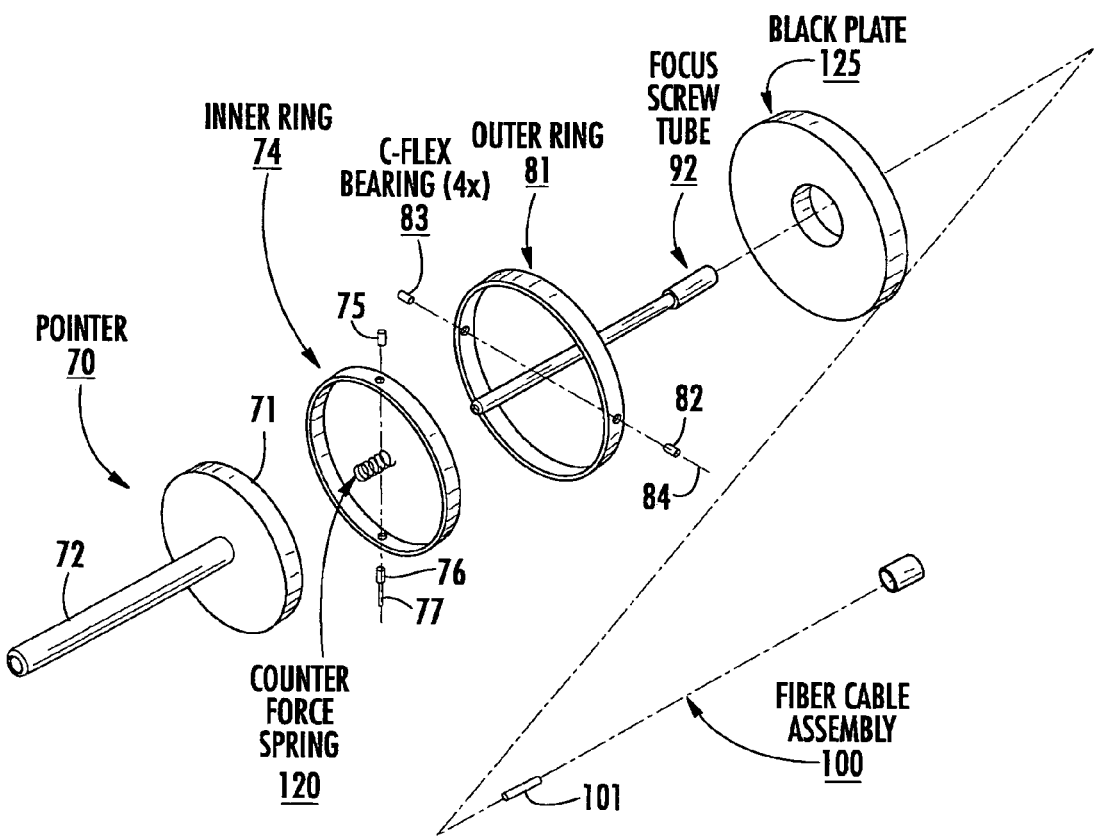
FIG. 13 is an exploded perspective view of a C-flex bearing-based tracker assembly employed in the cartridge of FIG. 12.
Figure 14:
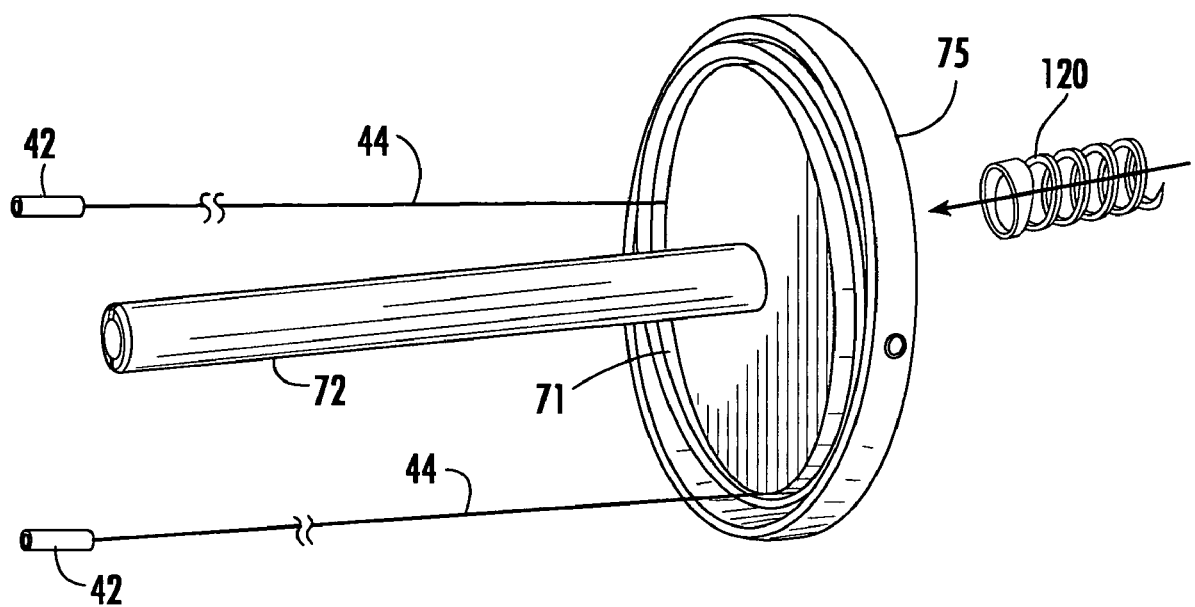
FIG. 14 is a perspective view of an assembled C-flex bearing-based tracker assembly employed in the cartridge of FIG. 12.
Figure 15:
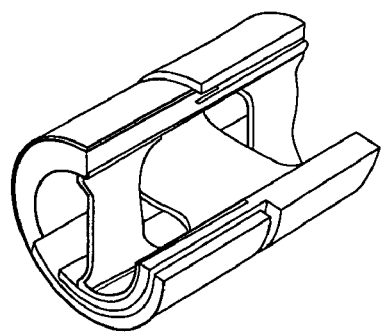
FIG. 15 is a perspective sectional view of a C-flex bearing.

Attention is now directed to FIG. 12, which is a diagrammatic side-interior view, FIG. 13, which is an exploded perspective view of a C-flex tracker assembly, and FIG. 14, which is a perspective assembled view of the components of FIG. 13. These Figures depict a third embodiment of the architecture of a respective cartridge that may be employed in place of the first and second cartridge embodiments described above. In the embodiment of FIGS. 12–14, the control arm of the first two embodiments is replaced by a pair of inner and outer rings that are supported by C-flex type bearing joints (a perspective section view of which is shown in FIG. 15) for mutually orthogonal rotation within a generally cylindrical back plate installed within a rear portion of the cartridge. In addition, the coherent fiber rod is replaced by an optical pointer into which a focus control screw tube and a fiber cable assembly have been inserted.

More particularly, with reference to FIGS. 12–15, a respective cartridge 30 is again configured as a generally cylindrically or tubular shaped metallic housing that is generally rotationally symmetric about a central (boresight) axis 35. As in the first embodiment, a forward end 36 of the cartridge has a step-contoured, cylindrical ring 37, that is sized to fit within and close the forward end of the cartridge, and to also securely capture a light directing component (e.g., a focusing lens) 38, the perimeter of which is captured by and sealed against the cylindrical ring 37. Again, the light directing component (lens 38) is not limited to a focusing lens, but may include other light directing elements such as mirrors and additional lenses. The function of the lens 38 is to interface light between collection, transmission aperture 39 at the end of a light pointer 70 and free space.

in the first embodiment, the perimeter portion of the cylindrical ring 37 contains a pair of bores, one of which is shown at 42 in the side view of FIG. 12. Again, a second bore is located a distance of 90° around the ring 37 in a plane normal to the boresight axis 35, relative to the location of bore 42, as viewed along the boresight axis 35 of the cartridge. Each of these two bores again terminates one end of a respective thermally controlled actuator 44, by means of a suitable fitting, such as a threaded bolt and screw, and the like. Each actuator wire may comprise a same length segment of stainless steel wire.

The other end of each actuator wire segment 44 is secured to a respective location of a generally disc-shaped base 71 from which a light pointer tube 72 of light pointer 70 projects along the boresight axis 35 toward the lens- 38. As in the first embodiment, the point of attachment 73 of an actuator wire segment on the disc-shaped member 71 lies in a plane that contains the boresight axis and the other end of the actuator wire, which is attached to a perimeter portion of the cylindrical ring 37. The disc-shaped base 71 is retained within an inner ring 74 by means of a pair of C-flex bearings 75 and 76 that provide for rotation of the disc-shaped base and thereby the pointer 72 relative to the inner ring about a generally vertical axis 77. Similarly, the inner ring 74 is, in turn, retained within an outer ring 81 by means of a pair of C-flex bearings 82, 83 that provide for rotation of the disc-shaped base and thereby the pointer 72 about a generally horizontal axis 84.

The outer frame is captured with a backplate 90, that is sized to fit within the interior cylindrical wall of the cartridge, as shown in FIG. 12. Light collection is effected by means of a fiber cable assembly 100, which is inserted through a generally wide diameter bore 91 in the backplate 90 and into a generally longitudinal focus screw tube 92, that is threaded into the light pointer tube 72 of the light pointer 70. In this manner, the boresight axis position of the distal end ferule 101 of the fiber cable assembly 100 is readily adjustable. As in the first embodiment, and as shown in FIG. 12, a bias spring 120 is inserted between the back plate 125 and the disc-shaped base 71, so as to make the light pointer tilt back and forth about respective axes 77 and 84 as the actuator wires 44 expand and contract in response to controlled current applied thereto. Also shown in the side view of FIG. 12 is a rear compartment that is sized to accommodate the fiber cable assembly and a lead-out connector 125, which is retained in a rear end cap 130.

In each of the above embodiments, initial aiming and calibration of the optical antenna may be readily accomplished by coupling the optical output of the antenna to a signal power measurement device, and then incrementally manually adjusting the pan/tilt mount until the monitored output is maximized. Thereafter, as shown diagrammatically in FIG. 16, using a beam splitter 150, the receiving antenna output is continuously monitored by an associated beam deflection signal processor 160, which executes a conventional beam aiming optimizing algorithm to establish control currents to the control inputs of the multipin electrical connector 60. As described above, by applying these control currents to the thermally controlled actuator wires, the aiming position of the collected light relay optics (e.g., coherent fiber rod) are adjusted, as necessary, so that the collection fiber is continuously steered in a manner, that causes the optical antenna to effectively track the received beam.

As will be appreciated from the foregoing description, the problem of initially obtaining and thereafter maintaining boresight accuracy in an optical antenna system is effectively obviated by the architecture of the present invention, which automatically controls the beam-steering optical transceiver components of a free space optical transmission system, through the use of electrically driven thermal actuators. The controlled application of heating current to the actuator wires causes their lengths to change, thereby flexing an axial deflection device through which a light relay element passes off boresight. The actuator wire subsystem augments a manual, coarse alignment subsystem, so as to maintain very precise mutual optical alignment of a pair of spaced apart optical transceiver subsystems.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An optical antenna for interfacing a light beam with an optical aperture comprising:
a light directing element having an optical axis fixedly mounted at a first location of said optical antenna, and being operative to focus said light beam incident thereon onto an optical waveguide coupled with said optical aperture; and
an optical waveguide passing through a controllably orientable support structure that is mounted at a second location of said optical antenna, so that an end of said optical waveguide is coupled with said optical aperture, said controllably orientable support structure being anchored to a plurality of anchoring locations by respective actuator wires, through which currents are controllably supplied for adjusting lengths of said wires and thus the orientation of said controllably orientable structure relative to said optical axis of said light directing element, and thereby defining deflection of said optical waveguide relative to said optical axis of said light directing element, wherein
first and second actuator wires are attached at first and second anchoring locations on said controllably orientable structure, said first and second anchoring locations lying in a first plane through which said optical axis passes, and wherein a first line from said first anchoring location to a point on said first plane through which said optical axis passes is orthogonal to a second line from said second anchoring location to said point on said first plane, and
first and second actuator wires are further attached at third and fourth anchoring locations spaced apart from said controllably orientable structure, said third and fourth anchoring locations lying in a second plane through which said optical axis passes, and wherein a third line from said third anchoring location to a point on said third plane through which said optical axis passes is orthogonal to a fourth line from said fourth anchoring location to said point on said second plane, and further comprising
a biasing element that imparts a biasing force against said controllably orientable support structure in a direction associated with deflection of said optical waveguide off the axis of said light directing element.

2. The optical antenna according to claim 1, further comprising a housing having a first portion at which said light directing element is fixedly mounted, and a second portion at which said controllably orientable support structure is mounted.

3. The optical antenna according to claim 2, wherein said controllably orientable support structure comprises a control arm having a first portion thereof supported at said second end of said housing by way of a flexure, and having second and third portions respectively containing said first and second anchoring locations.

4. The optical antenna according to claim 3, further comprising an optical waveguide retention element at said second end of said housing, and being translatable along said optical axis of said light directing element.

5. The optical antenna according to claim 1, wherein said optical waveguide comprises one of an optical fiber rod and an optical fiber installed in a syringe type needle tube.

6. The optical antenna according to claim 1, wherein control currents are applied to said actuator wires, so that the aiming position of said optical waveguide may be continuously adjusted, as necessary, to cause said optical antenna to effectively track a received light beam.

7. An optical antenna for interfacing a light beam with an optical aperture comprising:
a light directing element having an optical axis fixedly mounted at a first location of said optical antenna, and being operative to focus said light beam incident thereon onto an optical waveguide coupled with said optical aperture; and
an optical waveguide passing through a controllably orientable support structure that is mounted at a second location of said optical antenna, so that an end of said optical waveguide is coupled with said optical aperture, said controllably orientable support structure being anchored to a plurality of anchoring locations by respective actuator wires, through which currents are controllably supplied for adjusting lengths of said wires and thus the orientation of said controllably orientable structure relative to said optical axis of said light directing element, and thereby defining deflection of said optical waveguide relative to said optical axis of said light directing element, wherein
first and second actuator wires are attached at first and second anchoring locations on said controllably orientable structure, said first and second anchoring locations lying in a first plane through which said optical axis passes, and wherein a first line from said first anchoring location to a point on said first plane through which said optical axis passes is orthogonal to a second line from said second anchoring location to said point on said first plane, and
said first and second actuator wires are further attached at third and fourth anchoring locations spaced apart from said controllably orientable structure, said third and fourth anchoring locations lying in a second plane through which said optical axis passes, and wherein a third line from said third anchoring location to a point on said third plane through which said optical axis passes is orthogonal to a fourth line from said fourth anchoring location to said point on said second plane, and further comprising
a housing having a first portion at which said light directing element is fixedly mounted, and a second portion at which said controllably orientable support structure is mounted, wherein
said controllably orientable support structure comprises respective inner and outer ring members, said optical waveguide being bearing-mounted within said inner ring member, said inner ring member being bearing-mounted within said outer ring member, said outer ring member being fixed within said second portion of said housing.

8. The optical antenna according to claim 7, wherein said optical waveguide comprises a generally longitudinal tubular structure through which an optical fiber passes, and being integral with and extending from a generally discshaped member that is bearing-mounted within said inner ring member.

9. The optical antenna according to claim 8, wherein said generally longitudinal tubular structure is configured to support therein an inner tube, which retains said optical fiber and is axially translatable relative to said generally disc-shaped member.

10. The optical antenna according to claim 9, further comprising a biasing element that imparts a biasing force against said generally disc-shaped member in a direction associated with deflection of said generally longitudinal tubular structure off the axis of said light directing element.

11. The optical antenna according to claim 7, wherein said optical waveguide is mounted within said inner ring member by means of C-flex type bearings, and said inner ring member is within said outer ring member by means of C-flex type bearings.

12. The optical antenna according to claim 7, wherein said housing is affixed to a pan and tilt mounting structure, that provides for adjustment of the aiming direction of said optical antenna in azimuth and elevation.

13. The optical antenna according to claim 12, wherein said pan and tilt mounting structure comprises:
a mounting plate upon which a toothed pan wheel is mounted for rotation about an azimuth axis that is normal to the surface of said mounting plate, and a pair of pan pivot pins supported at said surface of said mounting plate adjacent to the perimeter of said toothed pan wheel, and being sized and spaced to allow insertion of a tool blade therebetween to engage a tooth of said toothed pan wheel and impart incremental rotational translation of said toothed pan wheel about said azimuth axis; and
an elevation adjustment support frame, supported on said toothed pan wheel, and containing an elevation adjustment axle that is normal to said azimuth axis, a toothed tilt wheel mounted for rotation about the elevation axis of said elevation adjustment axle, and a housing support element upon which said housing is mounted, which engages said toothed tilt wheel, such that rotation of said toothed tilt wheel about said elevation axis causes rotation of said housing support element and thereby said housing containing said lens and said optical waveguide about said elevation axis.

14. The optical antenna according to claim 13, wherein said elevation adjustment support frame contains a tilt pivot slot that provides access to said toothed tilt wheel, and is sized to allow insertion of a tool blade to engage a tooth of said toothed tilt wheel and impart incremental rotational translation of said toothed tilt wheel about said elevation axis.

15. The optical antenna according to claim 13, further including
an azimuth axis mounting bolt, that is coaxial with said azimuth axis and passes through apertures in each of said toothed pan wheel and said mounting plate and an associated tightening fitting which is adapted to tighten said toothed pan wheel against said mounting plate and thereby prevent rotation of said toothed pan wheel relative to said mounting plate; and
wherein said elevation adjustment axle comprises an elevation axle mounting bolt, that passes through apertures in said housing support element, toothed tilt wheel and said elevation adjustment support frame, and an associated tightening fitting which is adapted to tighten said toothed tilt wheel against said elevation adjustment support frame and said housing support element, and thereby prevent rotation of said toothed tilt wheel and said housing support element relative to said elevation adjustment support frame.

16. An optical antenna for interfacing a light beam with an optical aperture comprising:
an optical cartridge having a forward end that captures a light directing element, said light directing element interfacing light between an end of a light relay element retained by a control arm in the interior of said cartridge;
a plurality of actuator wires having respective first wire terminations at said forward end of said optical cartridge, said first wire terminations being mutually rotationally displaced a rotational distance of 90° from one another in a plane normal to a boresight axis of the cartridge, said actuator wires having second wire terminations coupled to respective locations of said control arm and being mutually rotationally displaced a rotational distance of 90° from one another in a plane passing through said control arm and being normal to said boresight axis of the cartridge; and
a current supply device that supplies heating currents to said actuator wires, so as to change the lengths of said wires and thereby flexing said control arm and said light relay element about said boresight axis, and further comprising
a pan/tilt mount, that is configured to rigidly attach the optical antenna to a supporting surface, while providing for incremental manual coarse adjustment of the pointing direction of the antenna for both azimuth and elevation.

17. The optical antenna according to claim 16, wherein control currents are applied to said actuator wires, so that the aiming position of said light relay element may be continuously adjusted, as necessary, to cause said optical antenna to effectively track a received light beam.

18. The optical antenna according to claim 16, wherein said light relay element comprises a fiber rod, that is retained by a fiber rod connector, so as to project coaxially along said boresight axis in the interior of said cartridge, and being positionable to bring an end facet thereof coincident with the focal plane of said light directing element.

19. The optical antenna according to claim 16, wherein said fiber rod passes through a bore of said control arm, so that off-axis deflection of said control arm imparts a corresponding off-axis deflection of said fiber rod.

20. The optical antenna according to claim 16, wherein said light relay element comprises a section of multimode fiber fed through a section of syringe needle tubing which is retained in said cartridge by a connector therefor.

21. An optical antenna for interfacing a light beam with an optical aperture comprising:
an optical cartridge having a forward end that captures a light directing element, said light directing element interfacing light between an end of a light relay element retained by a support tube device therefor in the interior of said cartridge;
a plurality of actuator wires having respective first wire terminations at said forward end of said optical cartridge, said first wire terminations being mutually rotationally displaced a rotational distance of 90° from one another in a plane normal to a boresight axis of the cartridge, said actuator wires having second wire terminations coupled to respective locations of said control arm and being mutually rotationally displaced a rotational distance of 90 from one another in a plane passing through said control arm and being normal to said boresight axis of the cartridge; and
a current supply device that supplies heating currents to said actuator wires, so as to change the lengths of said wires and thereby flexing said support tube device and said light relay element about said boresight axis, and further comprising
a pan/tilt mount, that is configured to rigidly attach the optical antenna to a supporting surface, while providing for incremental manual coarse adjustment of the pointing direction of the antenna for both azimuth and elevation.

22. The optical antenna according to claim 21, wherein said support tube device is support by a pair of inner and outer rings and an associated set of C-flex type bearing joints for mutually orthogonal rotation within a generally cylindrical back plate installed within said cartridge, said support tube device containing focus control screw tube and a fiber cable assembly, and wherein first ends of said actuator wires are connected to terminations around said light directing element, while other ends of said wire segments is secured to a respective location of a generally disc-shaped base from which a light pointer tube of said support tube device projects along said boresight axis.

23. The optical antenna according to claim 21, wherein control currents are applied to said actuator wires, so that the aiming position of said light relay element may be continuously adjusted, as necessary, to cause said optical antenna to effectively track a received light beam.

* * * * *